United States Patent [19]

Serres, Jr.

[11] 4,065,440

[45] Dec. 27, 1977

[54] MALONATE ESTER CHAIN COUPLING OF POLYESTERS

[75] Inventor: Carl Serres, Jr., Naperville, Ill.

[73] Assignee: Standard Oil Company (Indiana), Chicago, Ill.

[21] Appl. No.: 712,541

[22] Filed: Aug. 9, 1976

[51] Int. Cl.$^2$ .................... C08G 63/18; C08G 63/46
[52] U.S. Cl. .............................. 260/75 R; 260/75 T; 260/75 M
[58] Field of Search ................. 260/75 M, 75 T, 75 R

[56] References Cited

U.S. PATENT DOCUMENTS

| | | | |
|---|---|---|---|
| 3,954,716 | 5/1976 | Müller et al. | 260/75 T X |
| 3,962,190 | 6/1976 | Wear | 260/75 M X |

Primary Examiner—Howard E. Schain
Assistant Examiner—W. C. Danison, Jr.
Attorney, Agent, or Firm—William H. Magidson; Arthur G. Gilkes; William T. McClain

[57] ABSTRACT

Increasing the molecular weight of polyesters by reaction with polyfunctional acyl compounds having at least two alkylidene malonate groups.

10 Claims, No Drawings

MALONATE ESTER CHAIN COUPLING OF POLYESTERS

This invention relates to a process of increasing the molecular weight of polyesters by reacting a polyester with polyfunctional acyl compounds having at least two alkylidene malonate groups.

Polyesters are commonly reacted with various polyfunctional compounds in order to increase the molecular weight of the polyester by so-called chain coupling of two or more polyester chains. In general, these chain coupling agents contain various reactive groups such as carboxyl, hydroxy, amino, isocyanato, etc. While Wear U.S. Pat. No. 3,962,190 discloses chain coupling of polyesters using phenyl esters of aromatic polycarboxylic acids, monomeric alkyl esters have not been used as coupling or branching agents since the alcohol liberated during trans-esterification tends to degrade the polymer. This is apparently due to interaction of the alcohol with carboxyl groups of the polyester resulting in chain termination.

The general object of this invention is to provide a method of increasing the molecular weight of polyesters using monomeric esters. Other objects appear hereinafter.

For the purpose of this invention all I.V.s (inherent viscosities) were determined in a 60:40 phenol:tetrachloroethane at 30° C and 0.4 g/dl concentration.

I have now found that it is possible to increase the molecular weight of polyesters by reacting a polyester having an I.V. of at least 0.2 dl/g with polyfunctional acyl compounds having at least two alkylidene malonate groups. Unlike monomeric alkyl esters, the alkylidene esters do not yield low molecular weight monohydroxy compounds during ester interchange with polyesters. While Applicants do not wish to be bound by any theory, Applicants believe that the malonate esters are bis-ketene precursors and each alkylidene malonate group yields a ketene moiety that reacts rapidly with the polyester chain.

In somewhat greater detail, the process of this invention can be carried out by adding a polyfunctional acyl compound having at least two alkylidene malonate groups to a polyester having an inherent viscosity of at least 0.2 dl/g. The coupling agent can be added to a melt of the polyester or can be mixed with solid particulate polyester and then solid state polymerized. Coupling agents of this invention are particularly useful in polyesterification reactions between polyols and polycarboxylic acid compounds, preferably reactions of terephthalic acid or dimethyl terephthalate with ethylene glycol, butylene glycol, etc.

The polyfunctional acyl compounds having at least two alkylidene malonate groups can contain two or three malonate ester groupings each of which malonate ester groups provide effectively a single functional group for esterification with the polyester agent. Accordingly, while the compounds of this invention can contain from 4 to 6 ester groups, they behave as if they are difunctional or trifunctional. Suitable polyfunctional acyl compounds having at least two alkylidene malonate groups of this invention include diisopropylidene methylene di-(methylmalonate), triisopropylidene methane trimalonate, etc.

Although many of these compounds are described in the literature, they can be produced by reacting malonic acid with a ketone or aldehyde under acidic conditions to form an alkylidene malonate group followed by coupling of two or more malonate groups through the methylene linkages of the malonate esters by reaction with an aldehydic compound. These reactions can be represented as follows:

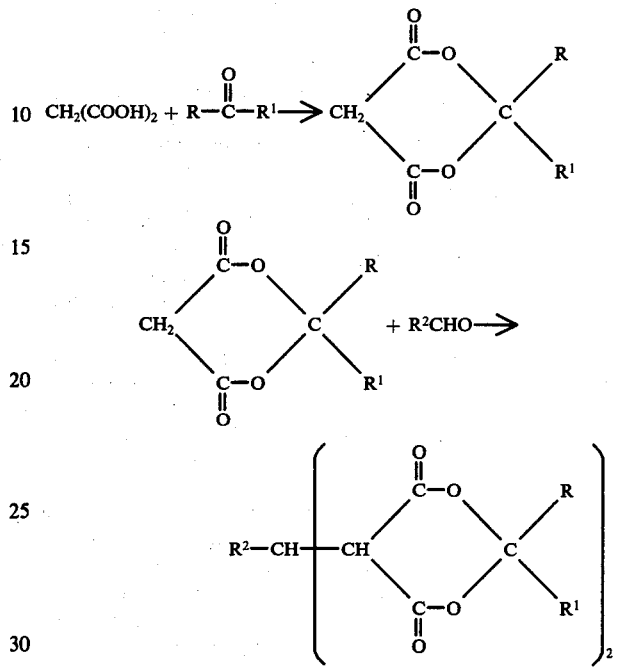

In the above equation R can be hydrogen, an alkyl group of from 1 to 4 carbon atoms such as methyl, ethyl, propyl, butyl, etc., $R^1$ can be an alkyl group of from 1 to 4 carbon atoms, or R and $R^1$ together can be a cycloalkyl group such as cyclopentyl, cyclohexyl, etc; $R^2$ can be hydrogen, alkyl of from 1 to 3 carbon atoms such as methyl, ethyl and propyl, aromatic groups of from 6 to 12 carbon atoms such as phenyl, naphthyl, etc. The trialkylidene malonate compounds can be produced by reacting the alkylidene malonate ester with a dialdehyde, such as isophthalaldehyde forming for example triisopropylidene m-(beta, beta, beta', beta'-isopropyl)-beta, beta-styrenehexacarboxylate, etc.

While any linear polyester having an I.V. of at least 0.2 dl/g can be used in this invention, the preferred polyesters have at least about 75 mol percent of their acid moieties provided by terephthalic acid moieties and/or naphthalene dicarboxylic acid (preferably 2,6-) moieties and the diol moieties are provided by glycols such as ethylene glycol, butylene glycol, 1,4-dimethylol cyclohexane, etc, aromatic diols such as hydroquinone, Bisphenol A, etc. Polyesters can also contain residues of other dicarboxylic acids such as adipic acid, isophthalic acid, sebacic acid, 2,5-dibromoterephthalic acid, etc.

In general, the polyfunctional acyl compounds having at least two alkylidene malonate groups can be added to a melt of a linear polyester having an I.V. of at least 0.2 dl/g and the condensation of the polyester can be carried out under conventional conditions. Alternatively, the polyfunctional acyl compounds having at least two alkylidene malonate groups can be mixed with a solid polyester and either melt polymerized or solid state polymerized. For solid state polymerization the polyester preferably has an initial starting I.V. of at least 0.3 dl/g and is then polymerized under conventional solid state polymerization conditions. In any case, the polyfunctional acyl compound having at least 2 alkylidene malonic groups can be used in a concentration of about 0.1 to 10 parts by weight, preferably 0.5 to 5.0 parts by weight per each 100 parts by weight of the polyester.

The following Examples are merely illustrative:

EXAMPLE I

One hundred thirty-five grams terephthalic acid, 76 grams ethylene glycol, 0.06 grams antimony triacetate (catalyst) and 0.73 grams diisopropylamine (ether suppressant) were polymerized at 280° C and 0.4 mm pressure for 210 minutes in a 2CV Helicone reactor. After the polyester had an I.V. of 0.46 dl/g, 2.2 grams of diisopropylidene methylene dimalonate was added to the reaction and the melt stirred for 10 minutes resulting in a coupled polyethylene terephthalate polyester having an I.V. of 0.59 dl/g.

The diisopropylidene methylene dimalonate used in this Example was prepared by adding 1.5 ml concentrated sulfuric acid over a 20 minute period to a stirred slurry of 52 grams malonic acid (0.5 mol) and 60 ml acetic anhydride (0.6 mol) in an erlenmeyer flask reactor. After the reactants were stirred for 3 hours at room temperature, 40 ml acetone (0.55 mols) were added with cooling and the reactants were maintained at 5° C for 16 hours. The crystalline product was filtered, washed with ice water and dried yielding 32 grams isopropylidene malonate having a melting point of 97°–98° C. A solution of 14.4 grams of isopropylidene malonate (0.1 mol), 4.0 grams of 37% aqueous formaldehyde (0.05 mol) and 40 ml dimethyl formamide was maintained at room temperature for 3 hours in an erlenmeyer flask. After the addition of 25 ml water, white crystals precipitated from the dimethyl formamide. The crystals were washed with water and dried yielding 10 grams of diisopropylidene methylene dimalonate which melted at from 152°–153° C.

EXAMPLE II

This Example illustrates the coupling of a polyester with diisopropylidene benzylidene dimalonate. The polyesterification described in Example I was repeated except that 2.2 grams of diisopropylidene benzylidene dimalonate was added to polyethylene terephthalate having an I.V. of 0.56 dl/g. After 10 minutes at 275° C., the I.V. of the polyethylene terephthalate was raised to 0.67 dl/g.

The diisopropylidene benzylidene dimalonate was prepared in the same manner as the diisopropylidene methylene dimalonate in Example I except that 10.6 grams of benzaldehyde (0.1 mole) were employed in place of the 37% aqueous formaldehyde.

EXAMPLE III

This Example illustrates the coupling of polyethylene terephthalate with diisopropylidene-1,1,2,2-cyclopropane tetracarboxylate. The polyesterification of Example I was repeated except that 2.2 grams of diisopropylidene-1,1,2,2-cyclopropane tetracarboxylate was added to the polyethylene terephthalate having an I.V. of 0.52 dl/g. After 10 minutes at 275° C., the polyester had an I.V. of 0.87 dl/g.

The diisopropylidene-1,1,2,2-cyclopropane tetracarboxylate was prepared by adding 21.0 grams iodine crystals to 12.0 grams diisopropylidene methylene dimalonate dissolved in 500 ml aqueous sodium hydroxide (3.2 grams sodium hydroxide on a dry solids basis). After stirring the reactants in a 1,000 ml beaker for 1½ hours at room temperature, off-white powder formed which was filtered, water washed and dried yielding 11.0 grams diisopropylidene-1,1,2,2-cyclopropane tetracarboxylate, which melted at 230° C.

EXAMPLE IV

The Example illustrates the addition of a coupling agent of this invention to solid polyethylene terephthalate followed by melt coupling. Five grams polyethylene terephthalate having an I.V. of 0.6 dl/g, ground to a mesh size, was slurried in a solution of 0.1 gram diisopropylidene-1,1,2,2-cyclopropane tetracarboxylate in 5 mls dichloromethane. After the dichloromethane was evaporated off, the coated polyethylene terephthalate was melted at 280° C. in a test tube reactor and held for 5 minutes before cooling. The polyester had an I.V. of 0.91 dl/g.

EXAMPLE V

This example illustrates the coupling of polyethylene terephthalate with diisopropylidene methylene di-(methylmalonate). The polyesterfication of Example I was repeated except that 2.2 grams diisopropylidene methylene di-(methylmalonate) was added to the polyester instead of diisopropylidene methylene malonate after the polyester had an I.V. of 0.48 dl/g. After 10 minutes at 275° C. the I.V. was increased to 0.6 dl/g.

The diisopropylidene methylene di-(methylmalonate) was prepared by adding 12 grams diisopropylidene methylene dimalonate over a 30 minute period to a stirred slurry of 10.4 grams silver oxide and 8.0 ml methyliodide in 100 ml acetonitrile, which was contained in a 300 ml beaker in an ice bath. After stirring overnight at room temperature, the reactants were filtered and the acetonitrile was evaporated off from the solute. The solute was crystallized from acetone-water yielding 12.0 grams of diisopropylidene methylene di-(methylmalonate), which melted at 132°–133° C.

EXAMPLE VI

Example IV was repeated except that 0.1 gram diisopropylidene methylene di-(methylmalonate) was coated onto ground polyethylene terephthalate having an I.V. of 0.6 dl/g instead of diisopropylidene-1,1,2,2-cyclopropane tetracarboxylate. After 5 minutes at 280° C. the polyethylene terephthalate had an I.V. of 0.84 dl/g.

EXAMPLE VII

This Example illustrates the coupling of a commercial polyester based on terephthalic acid, isophthalic acid and 1,4-butanediol sold by United Shoe Machinery as Bostik 7802. After 25 grams of the polyester having an I.V. of 0.61 dl/g was melted at 180° C in a glass flask with stirrer and nitrogen purge, 1.3 weight percent based on the weight of the polyester of diisopropylidene methylene di-(methylmalonate) was added. After 10 minutes at 180° C the polyester had an I.V. of 0.79 dl/g.

EXAMPLE VIII

Example VII was repeated except that 1.3 weight percent diisopropylidene benzylidene dimalonate was used in place of diisopropylidene methylene di-(methylmalonate). After 10 minutes at 180° C the I.V. was increased from 0.61 dl/g to 0.73 dl/g.

EXAMPLE IX

This Example illustrates chain coupling with dicyclohexylidene methylene dimalonate. Example VII was repeated except that 1.3 percent by weight dicyclohexylidene methylene dimalonate was employed in place of diisopropylidene methylene di-(methylmalonate). After 10 minutes at 180° C the inherent viscosity of the polyester increased from 0.62 dl/g to 0.82 dl/g.

The dicyclohexylidene methylene dimalonate used in this Example was prepared in the same manner as diisopropylidene methylene dimalonate in Example I except that 57 ml cyclohexanone was employed in place of acetone.

I claim:

1. The method of increasing the molecular weight of polyesters which comprises forming a composition comprising a polyester having an I.V. of at least 0.2 dl/g and 0.1 to 10 parts by weight of a compound having two or three alkylidene malonate groups per 100 parts by weight of said polyester and reacting said polyester and compound under melt or solid state polymerization conditions.

2. The process of claim 1 wherein said polyester has at least about 75 mol percent of the acid moieties provided by terephthalic acid moieties and/or naphthalene 2,6-dicarboxylic acid moieties.

3. The process of claim 1 wherein said compound contains at least 2 isopropylidene groups.

4. The process of claim 3 wherein said isopropylidene compound is diisopropylidene methylene dimalonate.

5. The process of claim 3, wherein said isopropylidene compound is diisopropylidene benzylidene dimalonate.

6. The process of claim 3 wherein said isopropylidene compound is diisopropylidene-1,1,2,2-cyclopropane tetracarboxylate.

7. The process of claim 3 wherein said isopropylidene compound is diisopropylidene methylene di-(methylmalonate).

8. The process of claim 1 wherein said compound contains at least two cyclohexylidene groups.

9. The process of claim 8 wherein said cyclohexylidene compound is dicyclohexylidene methylene dimalonate.

10. The process of claim 1 wherein said compound having at least two alkylidene malonate groups is present in a concentration of 0.5 to 5.0 parts by weight per 100 parts by weight polyester.

* * * * *